(12) United States Patent
Brück

(10) Patent No.: US 7,171,747 B2
(45) Date of Patent: Feb. 6, 2007

(54) METHOD FOR PRODUCING A HONEYCOMB BODY, AND A HONEYCOMB BODY

(75) Inventor: Rolf Brück, Bergisch Gladbach (DE)

(73) Assignee: Emitec Gesellschaft fuer Emissions-Technologie mbH, Lohmar (DE)

( * ) Notice: Subject to any disclaimer, the term of this patent is extended or adjusted under 35 U.S.C. 154(b) by 0 days.

(21) Appl. No.: 10/650,054

(22) Filed: Aug. 26, 2003

(65) Prior Publication Data

US 2004/0159358 A1      Aug. 19, 2004

Related U.S. Application Data

(63) Continuation of application No. PCT/EP02/02919, filed on Mar. 15, 2002.

(30) Foreign Application Priority Data

Mar. 16, 2001 (DE) ................. 101 12 678
Mar. 1, 2002  (DE) ................. 102 08 871

(51) Int. Cl.
  B21D 51/16 (2006.01)
  B23Q 17/00 (2006.01)
(52) U.S. Cl. ..................... 29/890; 29/407.05
(58) Field of Classification Search ........... 29/890, 29/407.01, 407.04, 407.05, 407.09, 432, 29/428, 505; 428/116; 228/181; 138/37
See application file for complete search history.

(56) References Cited

U.S. PATENT DOCUMENTS

| 4,832,998 A | 5/1989 | Cyron | |
| 5,105,539 A | 4/1992 | Maus et al. | |
| 5,139,844 A | 8/1992 | Maus et al. | |
| 5,307,626 A | 5/1994 | Maus et al. | |
| 5,658,536 A * | 8/1997 | Okabe et al. | 422/180 |
| 5,791,043 A * | 8/1998 | Okabe et al. | 29/890 |
| 6,761,980 B2 * | 7/2004 | Sato et al. | 428/593 |

FOREIGN PATENT DOCUMENTS

| DE | 88 16 154.4 U1 | 3/1989 | |
| DE | 101 12 678 A1 | 10/2002 | |
| EP | 0 245 737 B1 | 11/1987 | |
| EP | 0 430 945 B1 | 6/1991 | |
| GB | 1 452 982 | 10/1976 | |
| JP | 01012018 | * | 4/1987 |
| JP | 01012018 | * | 1/1989 |

* cited by examiner

*Primary Examiner*—John C. Hong
(74) *Attorney, Agent, or Firm*—Laurence A. Greenberg; Werner H. Stemer; Ralph E. Locher

(57) ABSTRACT

A honeycomb body is produced with a number of sheet layers, of which at least a part are at least partly structured sheet layers, which lend the honeycomb the property of permitting fluid to flow through the same as a result of the structure thereof. The honeycomb body has a given, continuous, free volume in the interior thereof, for receiving a measuring probe. The method includes selecting a section of a sheet strip from a feed roll, identifying the sheet layer and reading a corresponding hole position and a corresponding hole boundary from a memory, generating a hole with the hole boundary in the sheet layer at the given hole position before the further preparation of the honeycomb body, and winding, stacking and/or entwining of several such pre-prepared sections to give a honeycomb structure, such that a free volume for a measuring probe is formed from the individual holes.

10 Claims, 3 Drawing Sheets

METHOD FOR PRODUCING A HONEYCOMB BODY, AND A HONEYCOMB BODY

CROSS-REFERENCE TO RELATED APPLICATION

This application is a continuation of copending International Application No. PCT/EP02/02919, filed Mar. 15, 2002, which designated the United States and was not published in English.

BACKGROUND OF THE INVENTION

Field of the Invention

The invention relates to a method and an apparatus for producing honeycomb bodies, and to a honeycomb body.

Honeycomb bodies, whose fundamental construction is known, for example, from European Patent EP 0 245 737 B1, European Patent EP 0 430 945 B1 corresponding to U.S. Pat. No. 5,139,844, and British Patent GB 1,452,982 are widely used in automobile construction, and they are used in particular as catalytic converter support bodies in the exhaust gas processing system. As the limit values for the permissible hazardous emission concentrations in the exhaust gas emitted into the environment from an automobile are reduced ever further by lawmakers, methods which allow the exhaust gas processing process to be controlled are becoming ever more important. The measurement sensors which are required for such control and which allow, for example, the exhaust gas composition or else hazardous emission concentrations in the exhaust gas to be measured are a major component of an exhaust gas processing system which is operated in a controlled manner. The sensors are dependent on honeycomb bodies which allow the accommodation of one or more measurement sensors to provide data for controlling the catalytic processing, for example as known from German Utility Model DE 88 16 154 U1.

The measurements sensors that are used include, for example, probes that are used to determine the exhaust gas composition, such as lambda probes, as well as hydrocarbon sensors (HC sensors) that measure the hydrocarbon content of the exhaust gas. When installing a measurement sensor such as this in, for example, a honeycomb body that is formed from structured metal sheets and is used as a catalytic converter support body, various problems are known. First, at least for certain types, it is possible for all the sheet metal layers which are wound up to form a honeycomb body to be provided with a cutout in front of the winding in an area that is the same for all the sheet metal layers. This allows a measurement sensor to be introduced after the winding in this area, but this has the disadvantage that the free volume which is formed by the cutouts and which is used for holding the measurement sensor is considerably larger than the volume of the measurement sensor that is introduced into the honeycomb body. This leads to a loss of effective surface area in the honeycomb body that, for example, may have a catalytically active coating. This leads to the honeycomb body being less effective.

A further possibility is for a hole, for example, to be drilled in the honeycomb body after it has been wound. This method has various disadvantages. First, a method step such as this cannot be introduced within the process steps that generally already exist. In fact, this results in an additional process step, which must be carried out later. This leads to considerably greater production costs for the production of honeycomb bodies of this type. Furthermore, if a catalytically active coating has already been applied, it is possible while producing the hole for the catalytically active layer to become delaminated from the sheet metal layers that are used. This also reduces the efficiency of the honeycomb body during use. Finally, depending on the method that is used to do so, the drilling process also leads to partial blocking of the channels. This method, which in principle would also allow introduction of measurement sensors into ceramic honeycomb bodies, thus cannot be used without problems.

SUMMARY OF THE INVENTION

It is accordingly an object of the invention to provide a method and an apparatus for producing a honeycomb body, and a honeycomb body that overcome the above-mentioned disadvantages of the prior art methods and devices of this general type, which has a volume through which fluids can pass freely in its interior, and whose production costs are less than those for the methods stated above, and in which the effective surface area is not unnecessarily reduced in size.

The method according to the invention is used for producing a honeycomb body from a predetermined number of sheet metal layers from at least one supply roll, at least some of which are at least partially structured sheet metal layers whose structure allows a fluid to flow through the honeycomb body. In its interior, the honeycomb body has a predetermined free volume for a measurement sensor.

The method includes the following steps:
a) selection of a section of a sheet metal strip from the supply roll for a sheet metal layer of appropriate size;
b) identification of the sheet metal layer and reading of at least one associated hole position and at least one associated hole edge from a memory;
c) construction of at least one hole with the hole edge in the sheet metal layer at the at least one specific hole position;
d) if required, structuring of at least a portion of the section;
e) if required, separation of the section from the supply roll;
f) repetition of steps a) to e) until the predetermined number of sheet metal layers is reached;
g) if required, stacking the predetermined number of sheet metal layers corresponding to the identification of the individual sheet metal layers;
h) if required, repetition of steps a) to g) in order to produce two or more stacks;
i) winding of the at least one sheet metal layer or of the at least one sheet metal stack to form a honeycomb structure;
j) introduction of the honeycomb structure into a casing tube; and
k) introduction of the measurement sensor at a predetermined position into the honeycomb structure and the casing tube.

In this method, the steps b), c), d) and e) can be carried out in any desired sequence.

If a structured sheet metal layer, preferably a corrugated sheet metal layer, is considered by way of example, it is thus possible to appropriately perforate the sheet metal layer and then to structure the layer, although it is also possible to produce a structured sheet metal layer first, and then to perforate this subsequently.

The method also allows the construction of honeycomb bodies from a single metal sheet or from two or more metal sheets, as well as the construction of honeycomb bodies from one or more stacks of sheet metal layers. According to the invention, it is also possible to construct the honeycomb body from a single at least partially structured metal sheet.

The sheet metal layer can easily be identified since it is known during the production process where the section of the sheet metal strip that is currently to be processed will be located later in the honeycomb body. This can be done, for example, by an automatic apparatus for counting down the sheet metal layers that have been produced, in which the sheet metal layers are processed successively (from the inside outwards) with respect to their position in the honeycomb body after the winding process, although other solutions are also possible and are within the scope of the invention. In any case, the registration of the production steps and the movement of the sheet metal layer allow identification of the sheet metal layer.

The hole positions and the associated hole edges which are stored in the memory are specific to each sheet metal layer. If one of the n sheet metal layers which are required to produce the honeycomb body is identified as the sheet metal layer N1, the at least one hole edge and the at least one hole position which are associated with the sheet metal layer N1, can be read from the memory. A similar situation applies to all the subsequent sheet metal layers N2, N3, N4, ..., Nn. A hole edge is a curve which is closed in a coordinate system that is defined relative to the hole position.

One refinement is for the hole edges of each sheet metal layer Ni to be configured to be different, while in another refinement an identical hole edge is used for all the sheet metal layers. The hole positions may also be located outside the identified section of the sheet metal strip, which results in that the section is not perforated. It is also possible for there to be two or more hole positions in each section. It is just as possible for the section to be intended to have two or more holes, some of which are also only partially formed. This depends, for example, on the type of honeycomb body and further parameters such as the cell density, that is to say the number of cells per unit cross-sectional area. All of this information is stored in a suitable manner in the memory, and can be called up from it.

The method step for structuring may not just contain pure corrugation but, in fact, there are also embodiments according to the invention in which the sheet metal layers to be structured can be provided with primary and secondary structures, or two or more corrugation steps may be carried out one after the other in order, for example, to produce quite specific corrugation shapes.

By way of example, it is also advantageous to structure one section of a metal sheet only partially, so that a sheet metal strip is produced which, for example, is corrugated on one half and represents smooth layers on the other half. A sheet metal strip such as this allows, for example, a spiral honeycomb body to be wound with a large number of sheet metal layers in a simple manner.

A suitable combination of smooth and structured layers can be used to produce sheet metal stacks that can be wound to form honeycomb bodies. Once the sheet metal layers or the corresponding sheet metal stacks have been wound to form a honeycomb structure, they can be introduced into a casing tube.

In order to connect the sheet metal layers to one another and to connect the casing tube to the honeycomb structure, various connecting steps can be provided, for example soldering. To do this, it may be necessary to ensure appropriate solder distribution over the sheet metal layers by appropriate methods such as gluing, tinning and application of a passivation layer, so that a robust connection is produced between the individual sheet metal layers, as well as between the honeycomb structure and the casing tube, during the soldering process. Connection by welding is also possible.

According to one advantageous refinement of the method, the hole positions and the hole edges in the respective sheet metal layers are chosen such that a cohesive cavity is produced in the honeycomb body, whose free volume essentially corresponds at least to the volume of the measurement sensor which is introduced into the honeycomb body. This advantageously makes it possible to produce honeycomb bodies which have one measurement sensor, and in which little effective surface area is lost.

According to a further advantageous refinement of the method, the dimensions of the at least one hole in a sheet metal layer are larger by a predetermined tolerance value than the projection of the cross section of the measurement sensor onto the corresponding sheet metal layer. This makes it possible to take account of production tolerances. It is thus possible to introduce the measurement sensor into the honeycomb body without any problems even when production tolerances are present.

According to yet another advantageous refinement of the method, the stored hole position and/or the stored hole edge are determined for each sheet metal layer from the projection of the cross section of the measurement sensor onto the sheet metal layer in the wound state. This advantageously allows the required hole shapes to be determined very accurately, in order to produce a free volume for holding the measurement sensor.

The hole position and/or the hole edge can be derived before storage from a mathematical model calculation. Once the identification of the sheet metal layers is known, that is to say once the relative position of the sheet metal layer after the winding process is known, this allows the hole position and hole edges to be calculated from different sensors at different positions within the honeycomb body.

According to yet another advantageous refinement of the method, the hole position and/or the hole edge are determined for each sheet metal layer, before storage, on the basis of empirical values. This advantageously makes it possible to determine hole shapes and hole positions, even when no mathematical model exists for describing the corresponding honeycomb body.

According to yet another advantageous refinement of the method, the stored values for the hole position and/or the hole edge are adapted on the basis of the actual tolerance values between the measurement sensor and the free volume. This allows direct feedback to the production process as a function, for example, of batch-dependent production tolerances. It is thus possible to reduce material losses and losses of effective surface area by direct feedback even during the production process.

According to yet another advantageous refinement of the method, the holes are formed such that the cross section of the free volume allows the introduction of a measurement sensor with an essentially circular, oval or polygonal cross section, preferably an oval or quadrilateral cross section. It is particularly preferable in this context for the hole shape to be essentially oval. This takes account of the curvature of the sheet metal layers in the final honeycomb body.

According to yet another advantageous refinement of the method, a lambda probe or an HC sensor, preferably a lambda probe, are introduced as the measurement sensor. This advantageously allows the production of catalytic converters which have an integrated lambda probe or an integrated HC sensor, and which can be used, for example, to control an exhaust gas purification system.

Based on the idea according to the invention, an apparatus is proposed which is used for producing honeycomb bodies with a free volume for holding an integrated measurement sensor. The honeycomb bodies are produced from one or more metal sheets, at least some of which are at least partially structured such that their structure makes it possible for a fluid to flow through the honeycomb body. The apparatus has an identification unit for identification of a section of the metal sheet which will later form a specific sheet metal layer, with respect to its subsequent position in the honeycomb body, has a memory for storage of at least one hole edge and at least one hole position for each individual sheet metal layer in the honeycomb body, has a perforation unit with a perforation tool, if required structuring and reduction tools, and a stacking or winding unit. The memory and the perforation unit are connected via signal lines for transmission of the at least one hole edge and the at least one hole position.

The apparatus advantageously allows the production of a free volume for holding honeycomb bodies that have a measurement sensor. The identification unit identifies the sheet metal layers with respect to their subsequent position in the honeycomb body in the wound state. The memory contains the hole forms and hole positions that are specific to the sheet metal layers, and these are transmitted via signal lines to a perforation unit, which then uses the perforation tool to produce the holes at the appropriate positions with the appropriate hole edges.

According to one advantageous refinement of the apparatus, the hole positions and/or hole edges are determined from the section surface area of the measurement sensor with the sheet metal layers in the wound state. This allows the appropriate hole positions and hole edges to be determined and stored in a simple manner for each individual sheet metal layer, thus making it possible to produce a honeycomb body with a continuous free volume which corresponds essentially to the volume of the measurement sensor introduced into the honeycomb body. In this context, it is particularly preferable for a measurement sensor to have a circular, oval or polygonal cross section, preferably an oval or quadrilateral cross section.

According to a further advantageous refinement of the apparatus, the perforation tool produces an essentially oval cross section. This makes it possible to take account of the curved character of the sheet metal layers in the wound state.

A honeycomb body that has been produced using the method according to the invention or using the apparatus according to the invention is also within the scope of the invention.

According to one advantageous embodiment of the honeycomb body according to the invention, the measurement sensor is formed in the first 50% of the longitudinal extent of the honeycomb body in the flow direction, preferably in the first 30%, and particularly preferably in the first 15%. When positioning a measurement sensor in order to control an exhaust gas purification system having a honeycomb body, it is necessary to ensure that the control process can be carried out as quickly as possible while, on the other hand, the measurement sensor must be protected against damage. If a lambda probe were used, by way of example, although fitting the lambda probe as close as possible to the engine would on the one hand ensure that the exhaust gas purification system can be controlled very quickly, fitting the lambda probe upstream of the first honeycomb body would, on the other hand, subject it to the risk of damage since any water droplets in the exhaust gas during a cold start could actually lead to damage to the lambda probe, referred to as a water shock. It is thus advantageous to fit the lambda probe in the front area of the honeycomb body, since this avoids the risk of water shock. Any water droplets that are present strike the honeycomb body, where they are vaporized. Even during the cold starting phase, the honeycomb body very quickly reaches a sufficiently high temperature even in the end area that the water droplets can vaporize. Otherwise, water droplets are at least absorbed, or their impact is damped.

According to a further advantageous refinement of the honeycomb body, the penetration depth of the measurement sensor into the honeycomb body is less than 25% of the diameter of the honeycomb body, and is preferably less than 20%. This advantageously allows the introduction of a measurement sensor that allows effective control of an exhaust gas purification device, which contains the honeycomb body, with as little loss of effective surface area of the honeycomb body as possible at the same time.

According to yet another advantageous refinement of the honeycomb body, the measurement sensor is a lambda probe or an HC sensor. The use of a lambda probe or of a hydrocarbon sensor advantageously allows the exhaust gas purification device in the exhaust gas system of an internal combustion engine or of an automobile, for example, to be controlled. The use of a lambda probe in a system such as this has been particularly proven, and is preferred.

According to a further aspect of the invention, a honeycomb body produced using the method according to the invention and/or by an apparatus according to the invention is used as a catalytic converter support body in the exhaust gas system of an internal combustion engine, in particular for the internal combustion engine in a passenger vehicle.

Other features which are considered as characteristic for the invention are set forth in the appended claims.

Although the invention is illustrated and described herein as embodied in a method and an apparatus for producing a honeycomb body, and a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
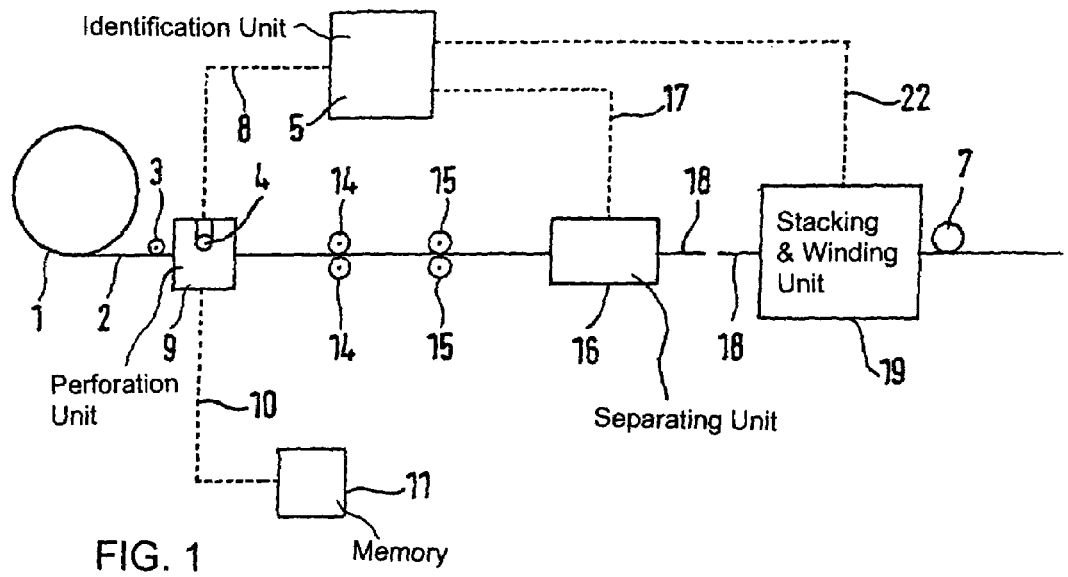
FIG. 1 is a block diagram of one exemplary embodiment of an apparatus according to the invention.
Figure 2:
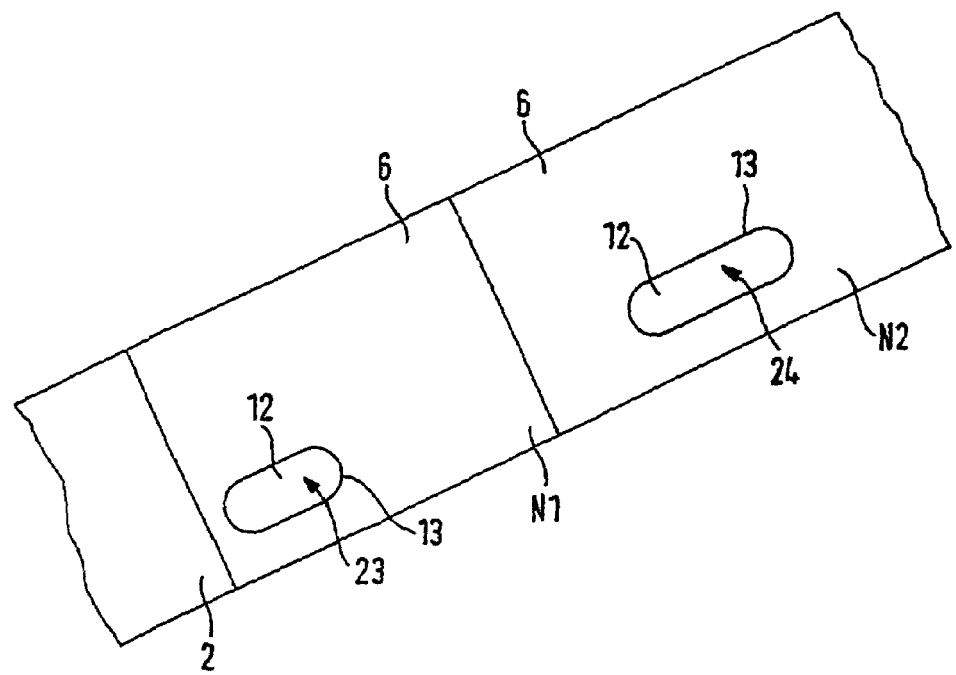
FIG. 2 is a diagrammatic, plan view of one example of a perforated sheet-metal strip according to the invention, with two sections.

Referring now to the Figures the drawing in detail and first, particularly, to FIGS. 1 and 2 thereof, there is shown an exemplary embodiment of a method according to the invention and of an apparatus according to the invention. A sheet metal strip 2 is unwound from a supply roll 1. A suitable device, for example a rotor 3 directed upstream or in an inlet area of a perforation unit 9, which device is connected via signal lines which are not shown to an identification unit 5, make it possible in the identification unit 5 in conjunction with further information from the production process, such as the required number n of sheet metal layers, which are identical to a corresponding section 6 of the sheet metal strip 2, to determine where the respective section 6 of the sheet metal strip 2 which is currently being processed will later be located in a honeycomb body 7 after a winding process. The section 6 of the sheet metal strip 2 is identified as section N1. The expressions section and sheet metal layer are essentially synonymous. A specific section of the sheet metal strip becomes a specific sheet metal layer in a honeycomb body composed of a large number of sheet metal layers in the course of the rest of the production process. Whether the sheet metal layers are individual metal sheets, that is to say whether the sections are separated in the course of the production process, or, as in the case of a spiral wound honeycomb body by way of example, they remain cohesive, depends on the type of honeycomb body.

The identification of the section 6 of the sheet metal strip 2 that is currently being processed is transmitted via a first signal line 8 to the perforation unit 9. The perforation unit 9 is connected to a memory 11 via a second signal line 10, and it can thus read the coordinate set associated with the identified section N1, containing at least one hole position 12 and at least one hole edge 13. Each hole edge 13 contains a closed curve, measured in the coordinates relative to the associated hole position 12.

Depending on the type of honeycomb body, that is to say by way of example depending on the type, cell density and/or diameter of the honeycomb body, there are different coordinate sets containing the hole positions 12 and the hole edges 13 for each of the N1 sections 6 which are wound to form the honeycomb body 7. It is thus possible that one section 6 may not need to be provided with any hole or with one or more holes, at least some of which may also partially be formed. The hole system which results from these coordinate sets is produced by the perforation unit 9, using one or more perforation tools 4. A perforation tool 4 may be a stamping tool, but the use of cutting and milling tools, for example a laser cutting tool, is also possible and within the scope of the invention.

After leaving the perforation unit 9, a structuring tool 14 may be used, if required, to produce at least partial structuring of the section 6. The structuring may, for example, contain corrugations, although other structures are also possible. It is also possible to use two or more structuring tools 14 which then, for example, form primary and secondary structures with different amplitudes, or which can also apply special structural shapes, which cannot be produced by a structuring tool 14, to the section 6. In any case, it is possible to reduce the amplitude of the structure by a reduction tool 15. When smooth sheet metal layers are being produced, there is no need to use the structuring tools 14.

A separation unit 16 if required separates the section 6 from the sheet metal strip 2. The separation unit 16 is connected to the identification unit 5 via a third signal line 17. The third signal line 17 can be used to interchange data in both directions between the identification unit 5 and the separation unit 16, so that the current operating state of the separation unit 16 can also be used for identification of that section 6 of the sheet metal strip 2 that is currently being processed. The feedback to the identification unit S synchronizes the individual production steps in the various units and tools 9, 14, 15, 16, 19, so that the system knows in each production step the unit 9, 14, 15, 16, 19 in which each section Ni is located.

After the separation of the section 6 from the sheet metal strip 2, a sheet metal layer 18 is formed which may either be smooth or may at least partially be structured, depending on the use of the structuring tools 14 on the section 6.

After leaving the separation tool 16 the sheet metal layers 18 are passed to a stacking and winding unit 19 where two or more sections N1, N2, N3, . . . are stacked to form sheet metal stacks where necessary for the honeycomb body type that is to be produced. Following this, n sheet metal layers 18 or sections 6, or a predetermined number of sheet metal stacks, are then wound to form a honeycomb structure 20 which, if required, is provided with a casing tube 21 and is then connected by suitable connection measures to form the honeycomb body 7. The honeycomb body 7 leaves the stacking and winding unit 19. The stacking and winding unit 19 is also connected to the identification unit 5 via a fourth signal line 22. The data relating to the current situation in the stacking and winding unit 19 can thus be used for identification of the component that is currently being processed. It is thus possible, for example, to use the number Nk of the sheet metal layers 18 which are already located in the stacking and winding unit 19 for identification.

This method is carried out for all the sheet metal layers 18, that is to say for the sheet metal layers N1, N2, N3, . . . until the n correct sheet metal layers 18 or sheet metal stacks are present in the stacking and winding unit 19, following which a honeycomb structure 20 is wound and is connected to a casing tube 21 to form a honeycomb body 7.

Departures from the sequence chosen are, if applicable, structures, preferably corrugations, definition of the hole shape and hole position, holes and, if appropriate, separation may also be made within the scope of the invention. Any desired combination of, if required, structuring, preferably corrugations, determination of hole shape and hole position, holes and, if required, separation is possible and is within the scope of the invention.

FIG. 2 shows the sheet metal strip 2 perforated according to the invention. This shows two sections 6, which have been identified as the section N1 and the section N2. The section N1 contains a first hole 23, the section N2 contains a second hole 24. These are each defined by the hole position 12 and the hole edge 13 defined relative to it.

The hole positions 12 and the hole edges 13 have been read from the memory 11 by the perforation unit 9 after identification of the sections N1, N2, by the identification unit 5. The perforation tool 4 of the perforation unit 9 has produced the appropriate holes 23, 24, for example by stamping or cutting them out, in each section N1, N2.

The hole positions 12 and hole edges 13 in the various sections N1 and N2 and, if appropriate, later sheet metal layers N1 and N2 and further sections N1 are determined such that a cohesive free volume 25 is formed in the wound honeycomb body 7.

Figure 3:
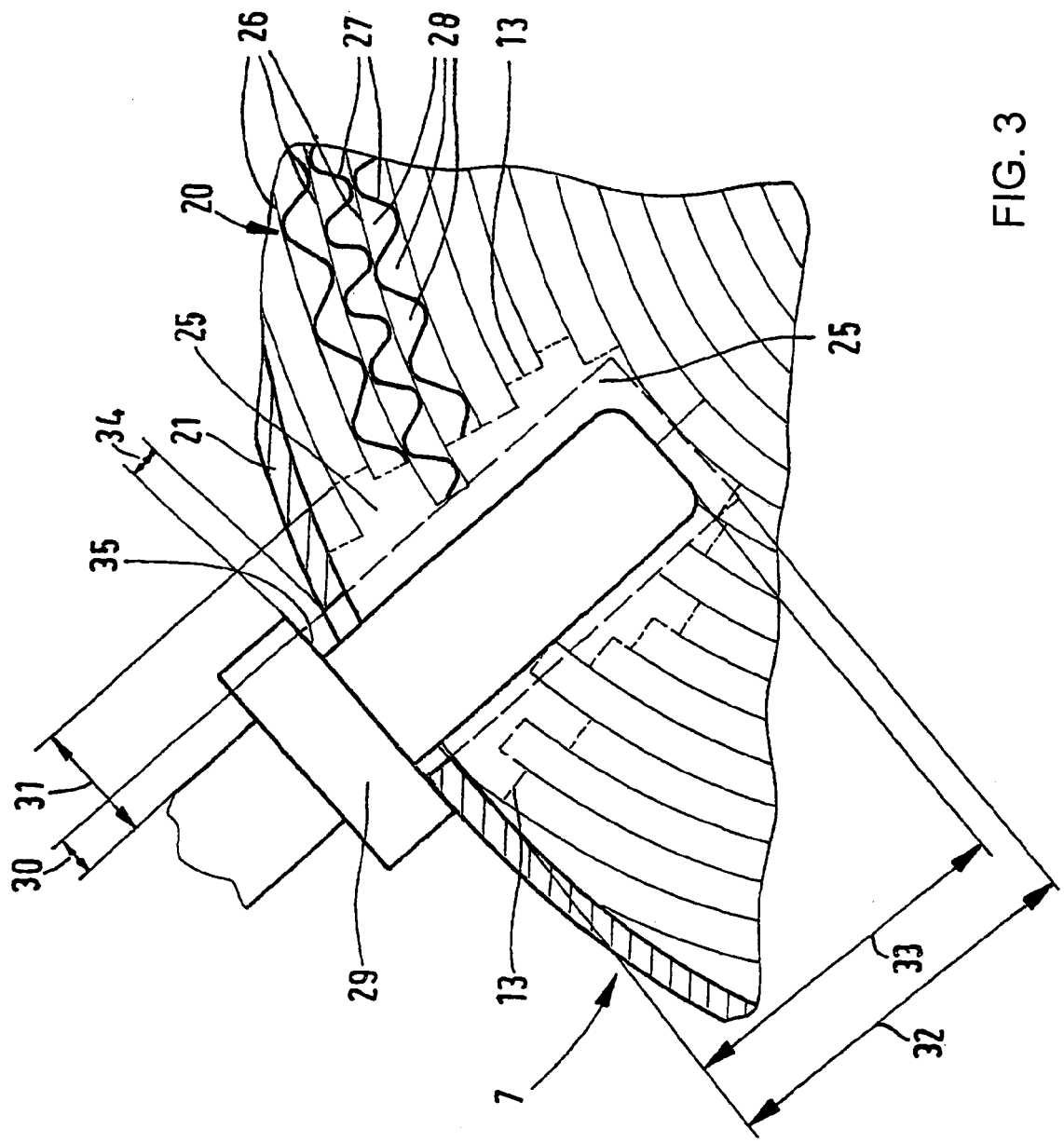
FIG. 3 is a diagrammatic, sectional view of a detail from a honeycomb body according to the invention.

FIG. 3 shows the honeycomb body 7 according to the invention with the honeycomb structure 20 and the casing tube 21. The honeycomb structure 20 is formed from smooth layers 26 and corrugated layers 27, only half of which are shown for the sake of clarity, but which form channels 28 through which a fluid can flow. A measurement sensor 29 is introduced into the honeycomb body 7, in the free volume 25 that is bounded by the hold edges 13, which are provided with reference symbols for example purposes. The free volume 25 is somewhat larger than the volume of the measurement sensor 29 that is introduced since, in order to compensate for any production tolerances that may occur, the extent of the hole edge 13 is somewhat larger than the corresponding cross section of the measurement sensor 29. This leads to the free volume being bounded in a manner which is not flush, and the boundary is in fact stepped since, for example, a first tolerance value 30 and a second tolerance value 31 are present. The hole depth 32 is also correspondingly somewhat larger than a recessed length 33 of the measurement sensor 29.

The oblique installation of the measurement sensor 29 as shown here leads to a third tolerance value 34 between the contact surface 35 of the measurement sensor 29 and the casing tube 21. If the measurement sensor 29 were to be introduced into the honeycomb body 7 in a straight line—as is also possible according to the invention—the third tolerance value 34 would not occur.

Figure 4:
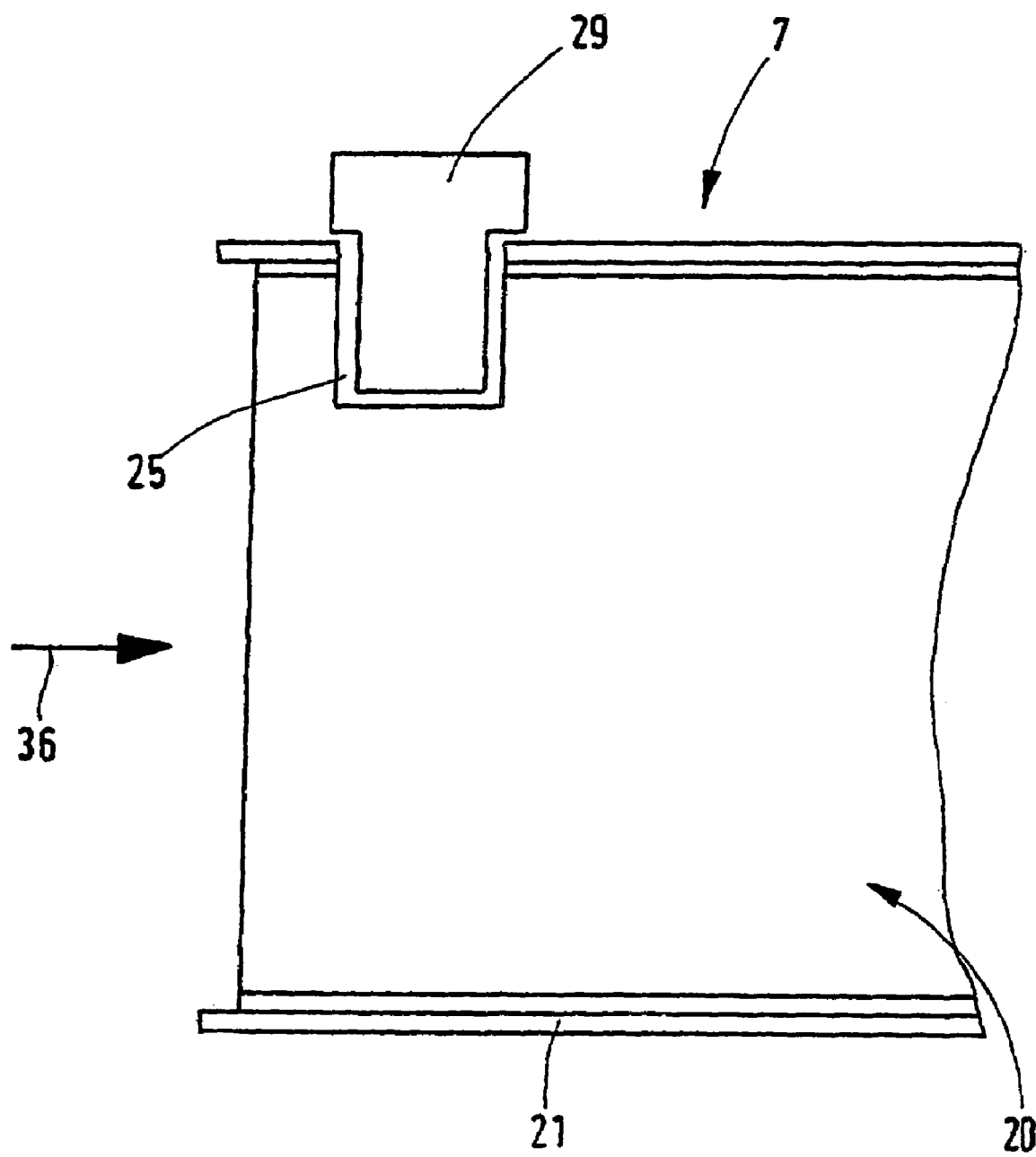
FIG. 4 is a schematic illustration of a honeycomb body according to the invention.

FIG. 4 shows a honeycomb body 7 that contains the casing tube 21 and the honeycomb structure 20 and has the cohesive free volume 25, into which the measurement sensor 29 is inserted, for example a lambda probe 29. The measurement sensor 29 is located in the front axial area of the honeycomb body 7 in the flow direction 36, in order to reduce the risk of the measurement sensor 29 being destroyed by water shocks.

I claim:

1. A method for producing a honeycomb body having a predetermined number of sheet metal layers from at least one supply roll, at least some of the sheet metal layers being at least partially structured sheet metal layers having structures making it possible for a fluid to flow through the honeycomb body, the honeycomb body having an interior with a predetermined cohesive free volume for receiving a measurement sensor, which comprises the steps of:
   a) selecting a section of a sheet metal strip from the supply roll for forming a sheet metal layer of appropriate size;
   b) identifying the sheet metal layer;
   c) reading at least one associated hole position and at least one associated hole edge from a memory to be formed in the sheet metal layer;
   d) constructing at least one hole with the hole edge in the sheet metal layer at the at least one associated hole position, identifying whether or not the sheet metal layer is to be corrugated, and corrugating at least a portion of the section of layers to be corrugated;
   e) identifying a section to be separated from the supply roll and separating any section identified as a section to be separated from the supply roll;
   f) repeating steps a) to if) for forming a predetermined number of the sheet metal layers;
   g) identifying whether or not the predetermined number of sheet metal layers need stacking and stacking the predetermined number of the sheet metal layers corresponding to an identification of the sheet metal layers of layers that need stacking;
   h) identifying a number of sheet metal stacks that are needed and repeating steps a) to h) for producing the number of sheet metal stacks;
   i) winding at least one of the sheet metal layer and at least one of the sheet metal stacks to form a honeycomb structure with smooth and corrugated sheet metal layers forming channels through which a fluid can flow;
   j) introducing the honeycomb structure into a casing tube;
   k) introducing the measurement sensor at a predetermined position into the honeycomb structure and the casing tube; and
   l) carrying out the steps d) and e) in any desired sequence order.

2. The method according to claim 1, which further comprises choosing the associated hole position and the associated hole edge in each of the sheet metal layers such that a cohesive cavity is produced in the honeycomb body, the cohesive cavity having a volume corresponding substantially at least to a volume of the measurement sensor introduced into the honeycomb body.

3. The method according to claim 2, which further comprises setting dimensions of the hole in the sheet metal layer to be larger by a predetermined tolerance value than a section surface area of the measurement sensor.

4. The method according to claim 1, which further comprise determining at least one of the associated hole position and the associated hole edge from a section surface area of the measurement sensor with the sheet metal layer in a wound state.

5. The method according to claim 1, which further comprises deriving at least one of the associated hole position and the associated hole edge from a mathematical model calculation before storing values for the associated hole position and the associated hole edge.

6. The method according to claim 1, which further comprises determining at least one of the associated hole position and the associated hole edge on a basis of empirical values before storing values for the associated hole position and the associated hole edge.

7. The method according to claim 1, which further comprises adapting stored values for the associated hole position and the associated hole edge on a basis of actual tolerance values between the measurement sensor and a boundary of the predetermined cohesive free volume.

8. The method according to claim 7, which further comprises forming the associated hole edge to be substantially oval shaped.

9. The method according to claim 1, which further comprises forming the hole such that a cross section of the predetermined cohesive free volume allows an introduction of the measurement sensor having a shape selected from the group consisting of a circular shape, an oval shape, a polygonal cross sectional shape and a quadrilateral cross sectional shape.

10. The method according to claim 1, which further comprises using one of a lambda probe and an HC sensor as the measurement sensor.

* * * * *